United States Patent
Price et al.

(10) Patent No.: US 9,575,155 B2
(45) Date of Patent: Feb. 21, 2017

(54) ULTRASONIC LOCATION DETERMINATION

(71) Applicant: Amazon Technologies, Inc., Reno, NV (US)

(72) Inventors: Andrew D. Price, Cupertino, CA (US); Kah Kuen Fu, Cupertino, CA (US); Kaixiang Hu, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 190 days.

(21) Appl. No.: 14/322,818

(22) Filed: Jul. 2, 2014

(65) Prior Publication Data

US 2014/0313858 A1    Oct. 23, 2014

Related U.S. Application Data

(63) Continuation of application No. 13/077,386, filed on Mar. 31, 2011, now Pat. No. 8,804,460.

(51) Int. Cl.
*G01S 3/80*  (2006.01)
*G01S 3/808* (2006.01)
*G01S 5/22*  (2006.01)
*G01S 5/02*  (2010.01)

(52) U.S. Cl.
CPC .............. *G01S 3/80* (2013.01); *G01S 3/8083* (2013.01); *G01S 5/22* (2013.01); *G01S 5/0284* (2013.01)

(58) Field of Classification Search
CPC ............ G01S 3/8083; G01S 5/22; G01S 3/80; G01S 5/0284
See application file for complete search history.

(56) References Cited

U.S. PATENT DOCUMENTS

| | | | | |
|---|---|---|---|---|
| 8,804,460 B1 * | 8/2014 | Price | ................... | G01S 3/8083 367/127 |
| 8,861,310 B1 * | 10/2014 | Karakotsios | .......... | G01S 3/8083 367/124 |
| 2004/0073360 A1 * | 4/2004 | Foxlin | ................... | G01C 21/16 701/517 |

(Continued)

OTHER PUBLICATIONS

U.S. Non-Final Office Action issued in U.S. Appl. No. 13/077,386 dated Sep. 24, 2013.

(Continued)

*Primary Examiner* — Daniel Pihulic
(74) *Attorney, Agent, or Firm* — Polsinelli LLP

(57) ABSTRACT

The relative positions of two or more electronic devices can be determined utilizing ultrasonic beacons. Each device can have a unique signature that can be included in the beacon broadcast by that device. A device having an array of ultrasonic detectors can receive a beacon and correlate the beacon received at each detector. The time of arrival then can be used to determine the relative position of the source of the beacon. The signature in that beacon can also be used to determine the identity of the device that broadcast the beacon, in order to determine the identity of the device, or a user of that device, at the determined relative position. The devices can be configured to transmit signals over the air or through a specific transmission medium, such as propagating surface. Further, a dedicated detector array can be used for determining multiple relative positions.

19 Claims, 6 Drawing Sheets

(56) References Cited

U.S. PATENT DOCUMENTS

| | | | | |
|---|---|---|---|---|
| 2010/0214068 A1* | 8/2010 | Nadkarni | ............... | G01S 5/22 340/10.1 |
| 2014/0313858 A1* | 10/2014 | Price | ............... | G01S 3/8083 367/127 |

OTHER PUBLICATIONS

U.S. Notice of Allowance issued in U.S. Appl. No. 13/077,386 dated Jan. 31, 2014.

* cited by examiner

ULTRASONIC LOCATION DETERMINATION

CROSS-REFERENCES TO RELATED APPLICATIONS

This application is a continuation of U.S. patent application Ser. No. 13/077,386, entitled "ULTRASONIC LOCATION DETERMINATION" filed Mar. 31, 2011, which issued on Aug. 12, 2014 as U.S. Pat. No. 8,804,460, and which is incorporated herein by reference for all purposes.

BACKGROUND

People are increasingly relying upon electronic devices for a wide variety of tasks. In many cases, people engaging in a meeting, playing a game, or otherwise interacting will each have at least one associated electronic device. In at least some of these instances, it can be desirable for the devices to be able to interact, or at least for one of the devices to be able to determine information about at least one of the other devices. While various technologies enable these electronic devices to determine each other's presence, such as by receiving a signal over a sideband channel, this information does not provide any indication of the relative position of that device other than the fact that the device is within a given range of detection. While certain components, such as global positioning systems, enable devices to communicate position information, these components are usually limited in accuracy, particularly when attempting to distinguish between a number of devices in a relatively small area, particularly when that area is indoors.

BRIEF DESCRIPTION OF THE DRAWINGS

Various embodiments in accordance with the present disclosure will be described with reference to the drawings, in which.

DETAILED DESCRIPTION

Figure 1:
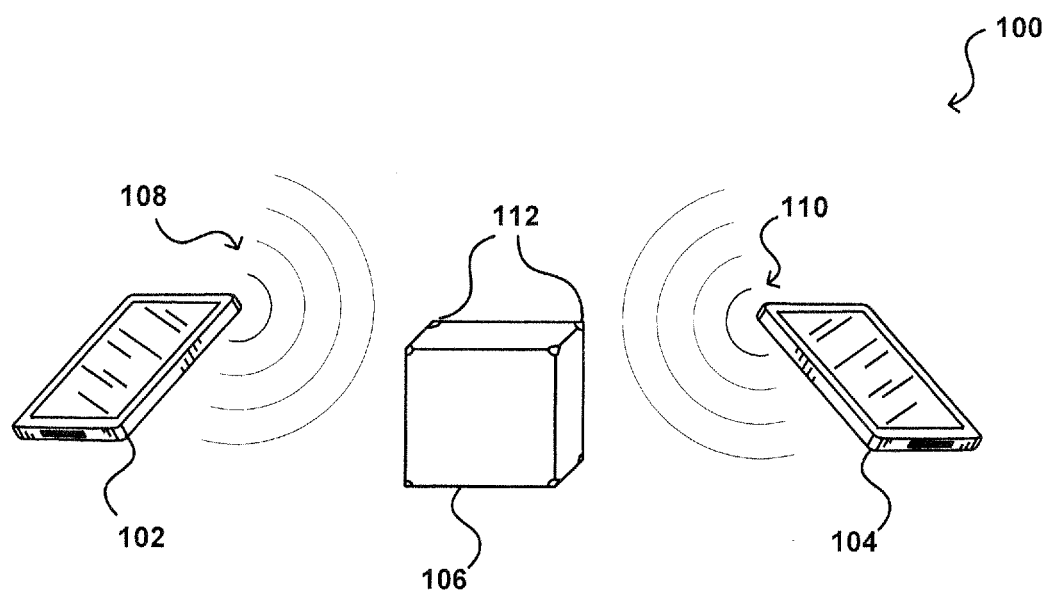
FIG. 1 illustrates an environment in which a detector assembly is able to receive ultrasonic signals from one or more electronic devices to be used in determining relative position in accordance with various embodiments.

Systems and methods in accordance with various embodiments of the present disclosure may overcome one or more of the aforementioned and other deficiencies experienced in conventional approaches to determining the relative position of an electronic device. In particular, various approaches utilize ultrasonic signaling to broadcast identifying information, such as unique signatures, identifiers, or codes, from one or more electronic devices attempting to determine and/or provide relative position. The ultrasonic signal can be received by at least one set of receivers or detectors separated or arranged such that the difference in the time of arrival of the signal between the receivers can be used to determine the relative position of the signaling device. The use of ultrasonic signals enables the process to be performed in a way that is substantially transparent to the users. Further, the use of an ultrasonic signal or beacon avoids line of sight limitations that would exist for optical solution, and enables accurate time of arrival determinations due to the relatively slow propagation speed of sound waves.

In various embodiments, a device can encode an identifier or signature in an ultrasonic signal and broadcast that signal as a beacon using at least one ultrasonic speaker or other such element. Any electronic device within a propagation range of that signal can receive that signal to at least a portion of an array of ultrasonic receivers. The receivers can be separated on the device by at least a minimum distance necessary to use time-difference information to determine a relative position of the source of the signal. Further, the receivers can be separated and/or positioned on the device such that a user holding the device is unlikely to cover up all of the receivers.

An electronic device receiving such an ultrasonic signal can decode the signal received at each receiver to correlate the received signal, and can compare the times at which the signal was received by each receiver. Using an appropriate position determination algorithm, the device (or a system or service in communication with the device) can utilize the time differences for the various receivers to determine the relative position of the source. The device can also correlate the signal with a specific device, as may have been communicated previously over a sideband channel or otherwise obtained. Once the relative position of a specific device is determined, that information can be utilized by an application and/or conveyed to a user, such as by displaying information for the device at a given location on a display element of the device. The device receiving the signal can communicate the relative position information to the sending device, or can transmit a similar ultrasonic signal using its own identifier in order to enable the other device to determine relative position using a similar algorithm. In some embodiments, each device can determine relative position and these determinations can be compared to improve accuracy.

In some embodiments, the devices might not each have ultrasonic sensors or it might be otherwise undesirable for each device to make separate relative position determinations. At least one receiver array can be used that is separate from the devices, which can receive signals from each nearby electronic device transmitting an appropriate ultrasonic signal. The receiver array, or a system or service in communication with the array, can utilize the captured signal information to determine the relative position of each device to a point associated with the receiver array, and can communicate this information to each transmitting device. By knowing the relative location of each device to a common point, the relative determinations of any two devices can be determined. The information transmitted to each device can be the relative position of each device to that common point, or a set of relative positions of each other device to the receiving device. Various other types of position information can be transmitted as well.

In embodiments where multiple devices are utilizing relative position information and each device is capable of receiving and transmitting an ultrasonic signal, one of the devices can be selected to act as a "master" device for the communications. In one embodiment, an electronic device is selected as the master using any appropriate criterion, such as the first device to send a communication or the device with the most capacity. The master can receive information indicating the presence of a nearby electronic device, and can attempt to communicate with that device to determine whether the device is capable of transmitting and/or receiving an ultrasonic signal. If the other device is to be included in the position determinations, the master can select an identifier to be used for that device, and can transmit that identifier to the identified device and potentially any other device in the communication group. The identified device then can transmit this identifier as part of an ultrasonic signal in order to enable the other devices to determine the position of that device, and obtain information about the identity of that device based on the transmitted identifier.

While in many embodiments the ultrasonic signal might be sent over the air, in at least some embodiments the devices can take advantage of a specific transmission medium. For example, people in a meeting or playing a game might each set an electronic device down on a desk or table. Since the top of the table or desk generally will transmit vibrations, a speaker on the back of each device can emit waves (e.g, ultrasonic or low frequency) that will be transmitted through the table top. Any other devices on the table can potentially detect the vibrations using speakers, detectors, and/or vibration sensors on the back (or bottom, etc.) of the device and determine relative position based at least in part upon the time differences for the received signal. Since the devices are at least somewhat constrained to a plane in this example, the number of necessary receivers can potentially be reduced relative to over-the-air determinations that may be desirable to be made in three dimensions.

Various other applications, processes and uses are presented below with respect to the various embodiments.

FIG. 1 illustrates an example situation 100 wherein there are two user devices 102, 104 that are each able to transmit an ultrasonic signal 108, 110. As mentioned, each device can have an identifier that can be encoded into the signal. Each user device can have its own permanent unique identifier, for example, or can be assigned an identifier as part of the communications process. There is also an external device 106 in this situation that includes an array or grouping of ultrasonic detectors 112. In this example the external device is a cube-shaped device 106 that includes one of eight detectors on each corner of the device, although any other appropriate shape and/or number of detectors can be used as well in other embodiments. It should be understood, however, that such an external device is not required in all embodiments as discussed in more detail below.

In this example, the first user device transmits a first ultrasonic signal 108 that includes the identifier or signature for that user device. The signal will be received at slightly different times by at least a portion of the detectors 112 of the external device. The external device can record or determine the time at which each detector received the signal including the identifier for the first device. If the external device includes a processor and an appropriate algorithm, for example, the external device 106 can use the time differences between receipt of the signal at the various detectors to determine a relative position of the first user device 102 to the external device 106. The external device can also decode the identifier in order to associate the relative location with that particular user device. The external device then can transmit the relative location information back to the first user device 102, using an appropriate protocol and transmission mechanism such as coding over an ultrasonic frequency, a sideband channel to transmit information over wireless Internet or BLUETOOTH protocols, etc. In some embodiments, the external device 106 can previously have received the signature or other identifying information from the first user device 102. In some embodiments, the external device 106 can include memory enabling the device to store signatures and relative position information for at least a determined period of time, or a period in which the device is detected within signaling range of the external device.

The second user device 104 can submit a similar signal 110 including the signature for the second user device. The external device can receive the signal and perform a similar operation to determine the relative position of the second user device 104. In this example, the external device 106 can also provide information to the first and second user devices about the relative position of the other user device. In one embodiment, the external device can provide information indicating the relative position of each device to a common point, such as may correspond to a center point of the detector array or another determined location. Thus, the external device might broadcast an array of information including an identifier for each device and relative coordinates for each device. In other embodiments, the device might provide the time difference information to each user device, whereby the user devices can make the appropriate determinations.

In still other embodiments, the external device 106 might determine the relative position of each user device with respect to a single user device, such as the first user device 102, and communicate identification information and relative position information with respect to that device. In this example, the external device could transmit, to the first user device 102, information including identifying information for the second user device 104, which could include the originally received signature or other identifying information, as well as relative position information for the second user device with respect to the first user device, not with respect to the external device. Various other types of information could be provided as well within the scope of the various embodiments.

Figure 2:
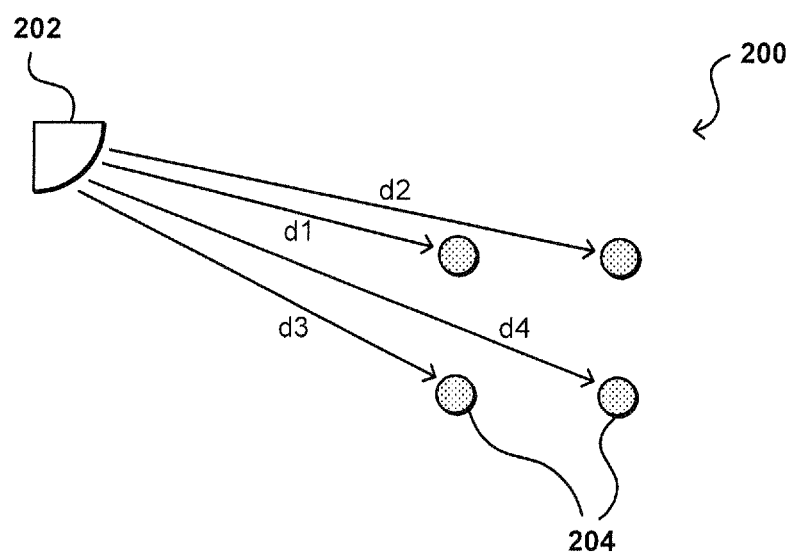
FIG. 2 illustrates an example configuration for determining relative position based upon an ultrasonic signal that can be utilized in accordance with various embodiments.

FIG. 2 illustrates an example situation 200 indicating how relative position information for a emitter 202 can be determined using an array of detectors 204 in accordance with various embodiments. In this example, at least four detectors 204 are positioned in an array so as to be able to receive an ultrasonic signal from a source 202 located within a given range of transmission. The detectors 204 are separated by a minimum distance such that a difference in time of arrival can be determined between a common signal being received by any pair of the detectors. As illustrated, there is a different distance (d1, d2, d3, d4) over which the signal must travel from the source 202 to each detector, and since the sound propagates through air at substantially the same speed there will be a corresponding difference in the time at which the signal is received by each detector. Using any appropriate algorithm known or used for such purposes, the differences in time can be used to determine the direction back to the source. Many such algorithms exist, and as such the determination algorithms will not be discussed herein in detail. As discussed, it can be desirable in free space to have at least four detectors to ensure an accurate position determination, although additional detectors can be utilized in other embodiments to improve position determinations, and fewer detectors can be used in other embodiments where cost savings is an issue or where there are other constraints, such as the devices being constrained to a plane as discussed elsewhere herein.

In some embodiments where the user devices themselves are able to transmit and receive ultrasonic signals, relative position information can be determined without use of an external device as discussed above. Consider the situation 300 illustrated in FIG. 3. In this example, at least one of the user devices can perform functionality similar to that described with respect to the external device. Here, a first user device 302 has an array of four ultrasonic detectors 310 capable of receiving ultrasonic signals transmitted by nearby second and third user devices 304, 306. The first user device also includes an ultrasonic transmitter 308 capable of broadcasting information using an ultrasonic signal. In some embodiments, each of the user devices can have ultrasonic transmitters and receivers, one or more ultrasonic transceivers, or other such elements, while in other embodiments some of the devices might have only transmitters or receivers, etc.

In this example, the first user device 302 transmits an ultrasonic signal 312 that is received by the nearby second and third user devices. If each of the second and third devices includes an array of ultrasonic receivers, each of those devices can determine the relative direction 314, 316 and/or position of the source device 302 with respect to that device. Alternatively, each of the second and third user devices 304, 306 could transmit a signal that could be received by the first user device 302, which could determine the relative position of each of those user devices with respect to the first user device.

In some embodiments, the first user device 302 could transmit the relative positions of the second and third devices 304, 306 to the second and third devices, which then can also determine their relative position with respect to each other. Alternatively, the first device can make that determination and send to the second and third user devices their relative position with respect to each other. In some embodiments, each of the user devices can transmit and receive signals and make independent position determinations, which may or may not be shared with the other devices. Various other approaches can be used as well within the scope of the various embodiments.

The user devices also can include components to help interpret a change in relative position. For example, the relative position determination might be affected equally by a user adjusting an orientation of a receiving device or another person changing the location of the broadcasting device. In at least some embodiments, a device can use an orientation-determining component such as an accelerometer or inertial sensor to help interpret any changes. For example, it might be desirable to utilize the same relative position for another device when a user device is tilted, even though based on the ultrasonic detection alone it might appear that the relative position has changed. Users or applications, for example, can specify how to handle such movements as appropriate.

As mentioned above, each device can be assigned an identifier that can be used to associate an ultrasonic signal with a particular device. In some embodiments, each user device can have a permanent, unique identifier that might be assigned at time of manufacture or initial configuration. While such an approach can simplify the identification process, and enable identifiers to be determined by contacting a service that tracks that information, the ability to provide unique identifiers can require the use of longer identifiers that require more complex and/or wider band ultrasonic transmitters and receivers (or transceivers, etc.), which can increase the cost of each device. Various other tradeoffs may be considered as well.

In some embodiments, there can be a limited set of identifiers that can be used to distinguish between devices in a current grouping. For example, a device might store a set of 64 or 128 identifiers that can be used to identify specific devices. If another device wants to communicate information for purposes of position determination, that device can be assigned one of the identifiers for a period that might expire after an amount of time, or that might no longer be associated with that device when the device leaves a transmission range, an application is closed, or another such criterion is met.

In some embodiments, one of the devices will be assigned to be the "master" device in charge of assigning and tracking signatures for specific devices. A master can be selected using any appropriate algorithm or criterion, such as the first device to send or receive device information, the device with a maximum capacity, a randomly selected master, etc. Each user device might be detected when coming within range of the master, such as by using BLUETOOTH or WiFi channels to transmit or broadcast information. The master can accept information from each device and associate that information with a selected signature from the set. The other devices can be notified of the presence of the additional device, as well as identifying information. The master can also determine and send relative position information for the new device based on ultrasonic signal analysis as discussed herein, or the relative position of the new device can be separately determined by at least a portion of the nearby devices.

It should be understood that there is a limited range over which the ultrasonic signal can be detected due to factors such as the attenuation of the signal. At certain power levels, the detectable range can be on the order of about five meters. The effective range can be increased or decreased as appropriate, but it can be desirable to limit the range to minimize interference and conserve power, among other issues.

Further, the ultrasonic signal can be broadcast at frequencies that are optimal for certain situations. In many embodiments, a frequency in about the 45 kHz to 60 kHz range can be utilized. Humans typically can hear up to about 20 kHz, and animals up to about 45 kHz, so it can be desirable to operate above these frequencies so as not to be distracting or annoying to humans or animals. Similarly, the attenuation can be great at frequencies in the hundreds of kilohertz, so it can be desirable to utilize lower frequencies. Other frequency ranges can be used as well, as appropriate.

Figure 3A:
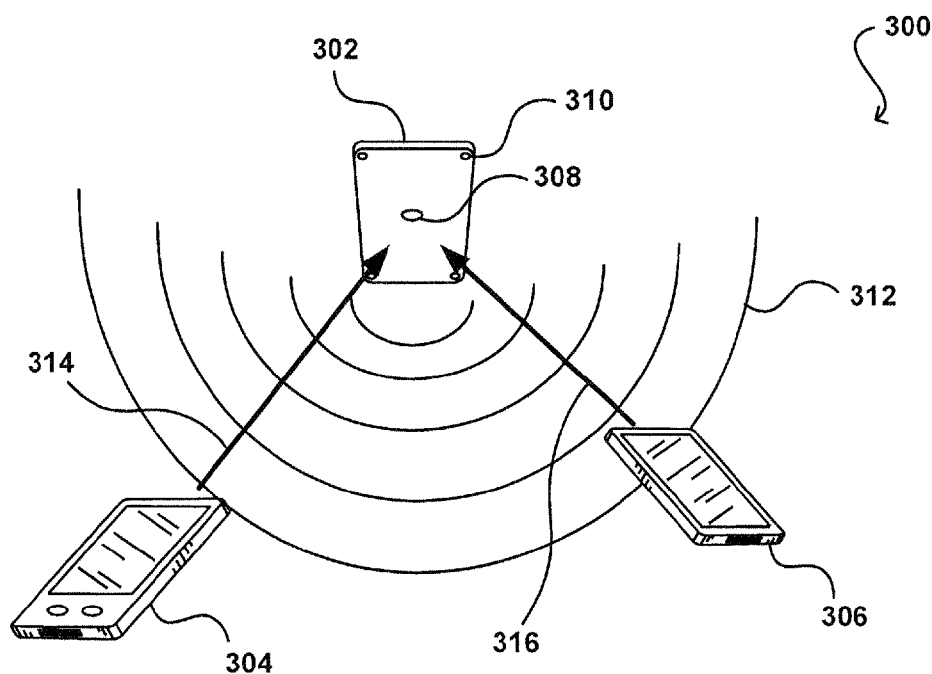
FIGS. 3(a) and 3(b) illustrate example an example situation for determining the relative location of specific user devices that can be generated in accordance with various embodiments.
Figure 3B:
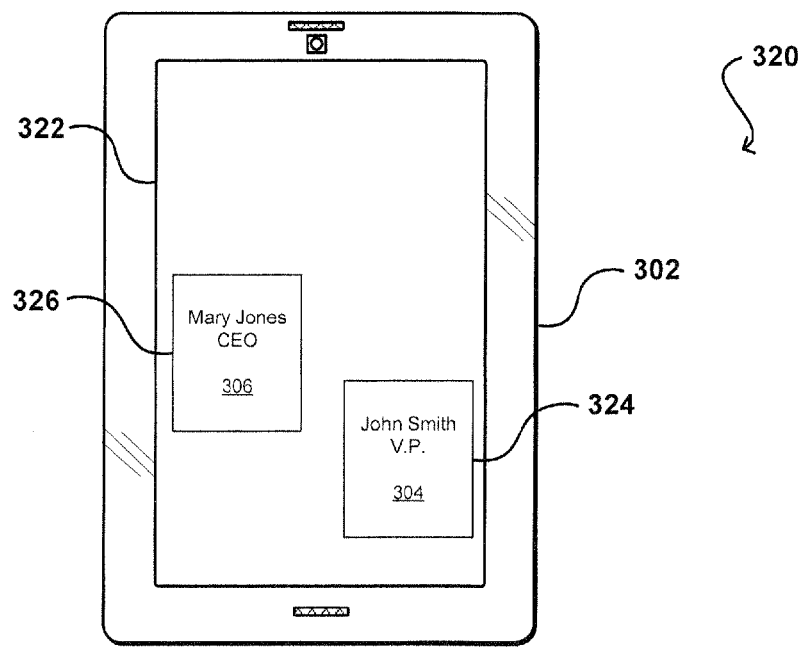

Being able to identify devices and determine the relative position of those devices can offer advantages for many different applications. For example, consider the situation 320 in FIG. 3(*b*). This situation might occur when the user devices belong to persons in a business meeting. In this example, user devices 302, 304, and 306 are positioned with respect to each other as illustrated in FIG. 3(*a*). Assuming that device 302 determined the relative position and identifying information as discussed above, the device can utilize that information advantageously to present information to the user. In this example, the display screen 322 on the first device 302 illustrates a graphical representation 324, 326 of each other detected user device 304, 306. The representations are displayed on the screen 322 with a relative orientation that reflects their relative position with respect to that device. The device also displays information associated with each device. Here, there is user information associated with each user device. Based on the transmitted signal from each device, the first user device 302 can distinguish the devices and determine each device's relative position, such that the information such as name and title of each user can be displayed in relative orientation to where that person's device is actually located. Such information can be particularly desirable in a meeting or other such situation.

The ability to identify particular devices and determine the relative location of those devices can have advantages for other applications as well. For example, in a card game the cards can be dealt to each device in order based on where those devices are located. For a sporting game, a user can cause information to be sent in a particular direction that corresponds to the position of a particular device. A number of other applications can utilize such information as well, such as is discussed in co-pending U.S. patent application Ser. No. 12/763,118, filed Apr. 19, 2010, entitled "Approaches for Device Location and Communication," which issued on May 21, 2013 as U.S. Pat. No. 8,447,070, and which is hereby incorporated herein by reference.

In some embodiments, the devices might have the ultrasonic transmitters and/or receivers positioned on a back or bottom surface of the device, such as is illustrated on the first user device 302 in FIG. 3(*a*). In such a configuration, the transmitters and receivers might be at least partially blocked when the device is set on a surface such as a table or desk. The blockage might prevent over-the-air transmission from occurring successfully. In at least some embodiments, however, the signal can be passed along to other devices using the fact that a surface such as a wooden table top can enable such signals to propagate over at least a given distance. The attenuation might be greater, but the surface area of the table is likely small enough that any device placed on the table can receive ultrasonic signals. If the speakers or receivers are positioned such that the device can pick up noise due to the vibration, the information can still be conveyed between devices in order to determine relative position. In some embodiments, an electronic vibration sensor or other such element can be used to detect the ultrasonic vibrations as well.

In some embodiments, the devices can operate in different modes depending on whether the device is being held such that over the air communication will likely work, or whether the device is on a surface such that surface-based propagation should be utilized. In some embodiments, a device can utilize an element such as an electronic gyroscope and/or light sensor to determine whether the device is likely placed on a surface in a particular orientation. If so, the device might shift into a different mode that utilizes surface-based transmission instead of over-the-air transmission. In some embodiments, the device might utilize different transmission and/or receive components, or might adjust a property of at least one such component. For example, the device might adjust a volume or frequency of a signal transmission based upon the transmission medium. Further, the device might activate or utilize different components based upon the mode. Various other factors can be considered, and adjustments made, in accordance with the various embodiments.

In embodiments where a surface propagation mode is utilized, it can be desirable to determine the propagation speed of the ultrasonic waves in the surface medium. For example, a wave will likely propagate at different speeds in solid wood, plywood, plastic, and other such materials. In at least one embodiment, two or more devices can be positioned relative to each other, such as end-to-end or side-to-side, and a calibration procedure can be performed. At least one of the devices can emit an ultrasonic pulse or signal, for example, which can be detected by another device after propagating through the surface material. If the emitters and detectors are a known distance from each other, such as when devices are placed end-to-end, the time it takes for a signal transmitted from one device to be received by the other device can provide an indication of the propagation speed of the material. This information then can be used for distance determinations when the devices are no longer in contact in the original orientation but are located on that surface. If the devices are not the same type of device, at least one of the devices might have to determine dimensional information about the other device (such as by obtaining from a network source) in order to make the determination.

A similar approach can be used to determine an optimal or at least preferable frequency to use for a particular propagation medium. For example, a device might transmit one or more signals at different frequencies, and at least one other device can return information about the accuracy and/or timing of the received signal. In some embodiments, a device might instead use one frequency for over the air signals and another for surface-propagating signals. For example, ultrasonic waves in the 45 kHz-200 kHz range might be used for over-the-air signaling, while low frequency waves on the order of about 1 Hz-1 kHz might be used for surface mode. In some embodiments, signals can be generated by an actuator or haptic motor, for example, generating signals with frequencies in the 150 Hz-500 Hz range.

Figure 4:
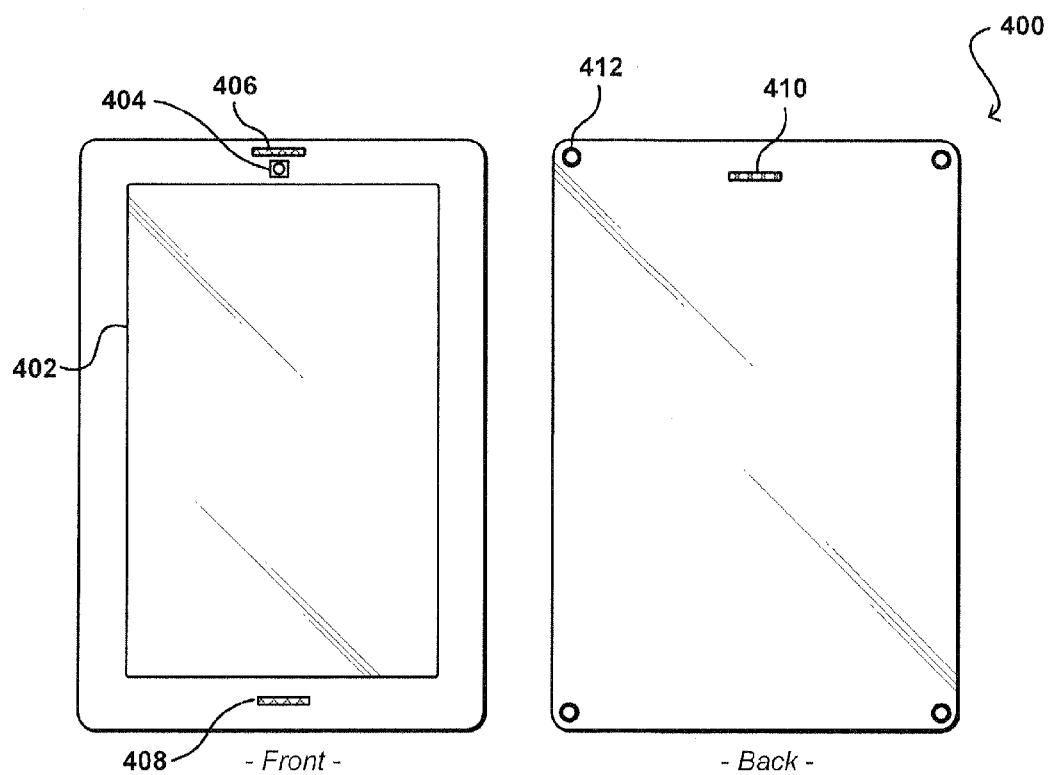
FIG. 4 illustrates front and back views of an example of a computing device including elements operable to capture audio and video information that can be used in accordance with various embodiments.

FIG. 4 illustrates front and back views of an example computing device 400 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, computer mice, remote controls, smart pens, and portable media players, among others.

In this example, the computing device 400 has a display screen 402, which under normal operation will display information to a user facing the display screen (e.g., on the same side of the computing device as the display screen). The computing device can also include at least one speaker 406 and at least one microphone 408 for transmitting and receiving audio, typically audio in the audible range of a human user. The device can also include at least one ultrasonic transmitter 410, such as may be able to produce waves in the ultrasonic frequency range that can carry encoded information as discussed elsewhere herein. The device also includes an array of ultrasonic receivers 412 positioned on the device so as to be able to determine position based at least in part upon time-difference determinations as discussed herein. There can be any appropriate number and arrangement of transmitters and receivers in the various embodiments. The transmitters and receivers also can be any appropriate components operable to transmit and receive ultrasonic waves over a specified range, such as 45 kHz to 60 kHz, with a given level of power and/or range. Although the receivers can be placed at any appropriate location on the device, placing the detectors on a "back"

surface of the device enables the device to work in both an "over the air" mode and a surface-based propagation mode as discussed herein. Various other aspects can be considered as well as would be apparent to one of ordinary skill in the art in light of the teachings and suggestions contained herein.

Figure 5:
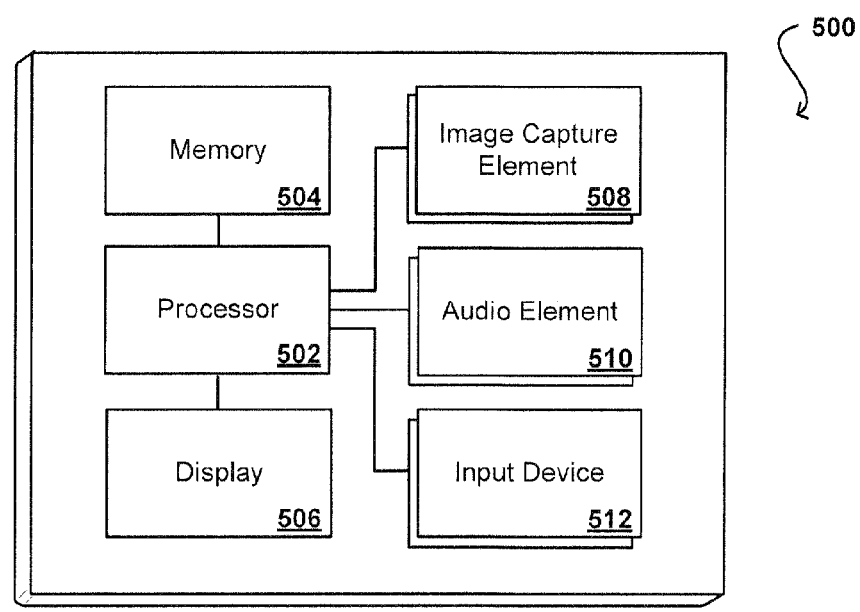
FIG. 5 illustrates example components of a computing device such as that illustrated in FIG. 4.

FIG. 5 illustrates a set of basic components of a computing device 500 such as the device 400 described with respect to FIG. 4. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the processor 502, the same or separate storage can be used for images or data, a removable memory can be available for sharing information with other devices, and any number of communication approaches can be available for sharing with other devices. The device typically will include some type of display element 506, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 508. An image capture element can include any appropriate technology, such as a CCD image capture element having a sufficient resolution, focal range and viewable area, to capture an image of the user when the user is operating the device. The device can include at least one additional input device 512 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or BLUETOOTH or other link as well in some embodiments. In some embodiments, however, such a device might not include any buttons at all and might be controlled only through a combination of visual and audio commands such that a user can control the device without having to be in contact with the device.

The device also can include multiple audio elements 510. These audio elements can include conventional speakers and/or microphones as known in the art. These elements can also include one or more ultrasonic transmitters and receivers operable to transmit and receive encoded ultrasonic signals. It some embodiments, the speakers and microphones might be able to handle frequencies in the audible and ultrasonic ranges. The device can also include one or more side band communication elements (not shown), operable to enable the device to communicate with other devices over a sideband channel, such as BLUETOOTH or WiFi. As discussed, a device can receive identifying or presence information over the sideband channel, which can cause the device to activate a listening mode to attempt to locate ultrasonic signals that can be used to determine a relative location of at least one other electronic device. Various other components can be used as well as should be apparent in light of the present disclosure.

Figure 6:
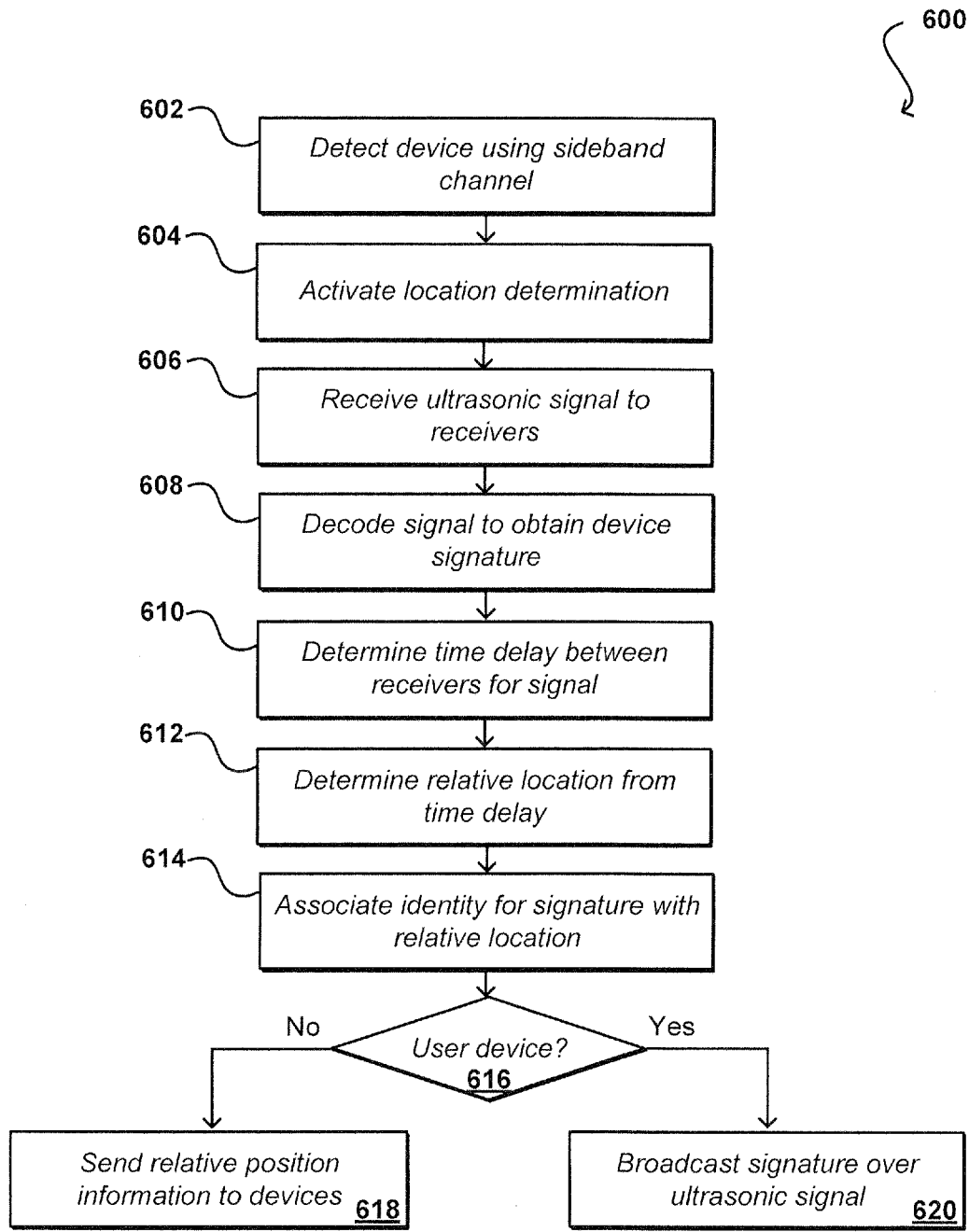
FIG. 6 illustrates an example process for determining relative device location that can be used in accordance with various embodiments.

FIG. 6 illustrates an example process 600 for determining relative position using ultrasonic signals that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a device is detected over a sideband channel 602. The sideband channel can be, for example, a wireless communication channel such as BLUETOOTH or WiFi, as discussed elsewhere herein. Various other approaches can be used to detect one or more nearby devices as well, such as image analysis or radio frequency (RF) signaling. In response to detecting a nearby device, or at any other appropriate time, a location determination mode or process can be activated 604. In at least some embodiments, this can include sending ultrasonic signals and/or listening for ultrasonic signals. In this example, an ultrasonic signal is received from a nearby device 606. The signal can be received by any or all of the ultrasonic detectors listening for the signal. The signal can be decoded or otherwise processed to determine or obtain the signature contained in the signal 608, which identifies the device sending the signal. The signature also can be used to correlate the information received at each detector such that the same signal is being analyzed for each detector.

The times at which the signal was received by each detector can be determined through the signature correlation. Using any appropriate technique discussed or suggested herein, the time difference of arrival of the signature to each detector in the array, as well as the relative position of each receiving detector, can be used to determine the relative position or location of the sending source 612. The signature information also can be correlated with identity information for the user or device sending the signal, such as a device identifier or user's name and title, and this information can be associated with that relative position 614. If the device making at least part of the determination or association is a user device 616, for example, the user device can broadcast that signature over an ultrasonic signal 620 such that the other device, and any other such devices, can also determine their relative position to the user device using a similar process. It should be understood, however, that in other embodiments the device could also send position information over the sideband channel or otherwise provide the information. If the determining device is an external device or other such component, the external device can send position information to both the sending and receiving devices 618 over an appropriate channel, such as the sideband channel. Various other approaches can be used as well in accordance with other embodiments.

Figure 7:
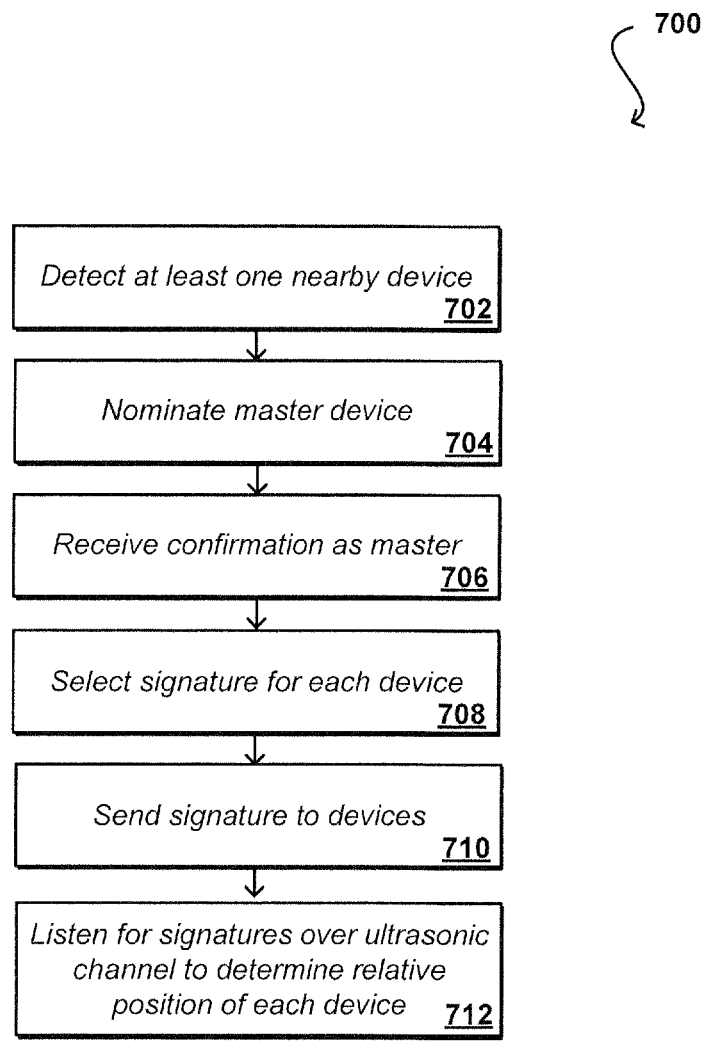
FIG. 7 illustrates an example process for determining relative positions among devices that can be used in accordance with various embodiments.

FIG. 7 illustrates an example process 700 for assigning signatures that can be used with a process such as that described with respect to FIG. 6 in accordance with various embodiments. In this example, the communications flow according to a peer-to-peer type model, wherein devices communicate with each other directly in at least most cases. The devices can detect each other using any appropriate approach discussed herein 702. When there are at least two user devices located nearby who wish to utilize position information for an appropriate purpose, one of the devices can be nominated or otherwise selected to act as the master device for purposes of at least position determination 704 as discussed herein. Once a master is selected, each device can receive confirmation of the selected master device 706. The master device can assign each device a signature to be used in determining position 708. The master device might have a fixed set of selectable signatures, might randomly generate signatures or identifiers, etc. The appropriate signature(s) then can be sent to each device 710 for use in signaling. One or more of the devices then can listen for those signatures over an ultrasonic channel in order to determine the relative position of each device 712. As mentioned, in some embodiments not every device has to separately determine the position of each other device, as the information can be shared over a separate channel. In some embodiments, only the master might listen for signals sent by other devices, or vice versa. Various other approaches can be utilized as well as discussed and suggested elsewhere herein.

Depending at least in part upon the protocol used, for example, a new selection process might be performed if the master leaves or otherwise becomes unavailable. The other devices can continue to use the assigned sequences, or the newly selected master device can assign new sequences to at least some of the devices. In some embodiments, a secondary can be selected initially in order to minimize any downtime.

In some embodiments, the ultrasonic signal is sent substantially continuously, or at least regularly or periodically, by each device. In other embodiments, the signal might be transmitted only in response to certain events or actions in order to conserve power and/or resources. For example, a device might transmit a signal if an accelerometer or other component of a device determines that the device is moving. In response, each other device might transmit a signal as well in order to update the relative position determinations. Various other actions, such as a user opening an application or sending a request, can cause the signals to be sent or resent in various embodiments.

In some embodiments, the data can be post-processed to exclude erroneous data or determinations. For example, results that indicate that a device made an instantaneous jump to a distant location can be discarded. Similarly, other data where the signature may not correlate sufficiently due to noise or other issues can be discarded to improve accuracy. Various other data analysis can be used as well using approaches known or used in the art for such purposes.

As mentioned, in at least some embodiments each device can have a permanent unique code that can be shared with other devices. Using such an approach, a device can determine when another user is nearby by detecting an ultrasonic signal broadcasting a known or recognized code. A user could also track the position of a device with a known signature, such as may belong to a child, where the user wants to monitor that position or be notified when that device goes outside an acceptable range of positions. In certain modes, a device might continuously broadcast the signal for detection by other devices that are recognized. For example, a user could walk into a crowded bar or sporting event and be able to locate another person based upon the ultrasonic signal carrying the appropriate signature. In some embodiments a combination of location determining approaches can be used, such as to use GPS data to get an approximate location, and then use ultrasonic position determining information to obtain a more precise location. Ultrasonic position determination can determine a relative position to within a few centimeters in one example, even when indoors, which exceeds the resolution or capabilities of conventional GPS devices in many situations.

As mentioned, an ultrasonic frequency-based approach can have several advantages over other time of arrival (TOA) solutions, such as may be based on RF or optical signals. The speed of sound in air (343 m/s) is far slower than the speed of light (~3×10$^8$ m/x) at which RF signals travel. Accurately measuring TOA for RF signals thus can be far more difficult than for ultrasonic signals. Additionally, the propagation of ultrasonic waves does not require the line of sight that an optical solution would. Ultrasound waves can diffract around obstacles such as bodies and office furniture as well as reflect off walls. Devices can modulate their ultrasonic tone with their assigned signature, which can be any appropriate signature such as a number of commonly used codes that are mutually orthogonal (such as Gold codes). A cross correlation between the signals can be performed to extract TOA information. A device then can calculate, via simple vector arithmetic, its position relative to any other device. This process can be repeated periodically to update the device positions. A device might get new position information about every 100 ms or so in one example.

The accuracy of the determination can depend on several factors, including the transmitted tone and the physics of the environment. With some modest requirements on the transmit tone, accuracy of around 3 cm is possible in some embodiments. The approach relies on knowing the speed of sound in a particular medium, such as air, but the speed of sound varies with environmental factors such as temperature and humidity. These, however, could potentially be measured and compensated for. Further, the speed of sound varies greatly with the material it travels through. For approaches that utilize transmission mediums such as wood, the speed of propagation can vary accordingly. As discussed, reflections can cause difficulties, but there are existing techniques for addressing reflections in TOA determinations.

Figure 8:
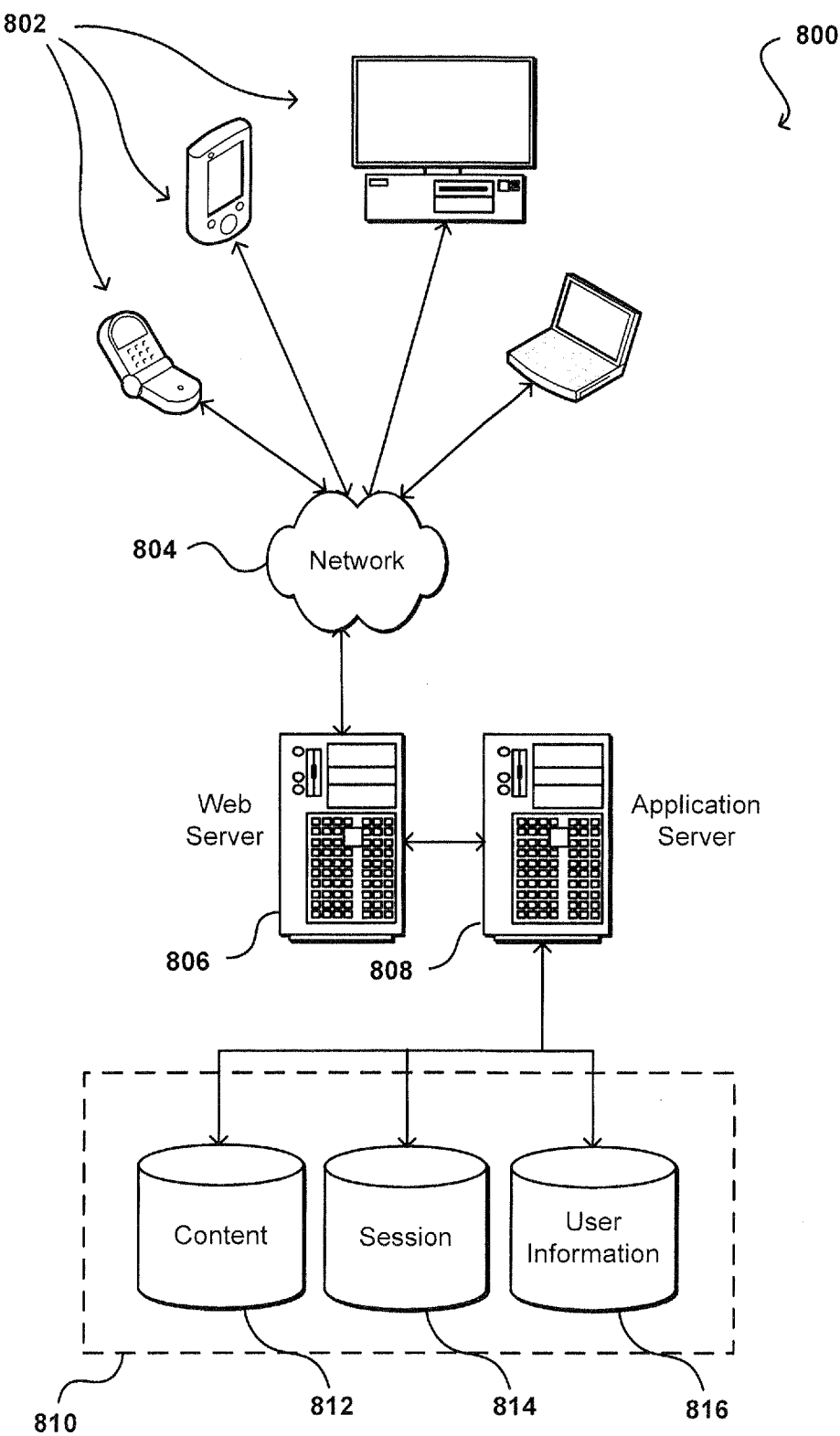
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, JAVA servers and business application servers. The server(s) may also be capable of executing programs or scripts in response requests from user devices, such as by executing one or more Web applications that may be implemented as one or more scripts or programs written in any programming language, such as JAVA, C, C# or C++ or any scripting language, such as Perl, Python or TCL, as well as combinations thereof. The server(s) may also include database servers, including without limitation those commercially available from ORACLE, MICROSOFT, SYBASE and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary riles for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    detecting a first electronic device from a plurality of electronic devices;
    determining a signature for the first electronic device;
    sending, to the first electronic device, the signature;
    receiving, from the first electronic device, a beacon through at least two detectors in an array of detectors, the beacon including a sound representation of the signature for the first electronic device;
    determining a time difference of arrival for the beacon received by the at least two detectors;
    determining a relative position of the first electronic device based at least in part upon the time difference of arrival;
    determining an identity associated with the first electronic device based at least on the signature; and
    associating the identity associated with the first electronic device with the relative position of the first electronic device.

2. The computer-implemented method of claim 1, further comprising:
    extracting the signature included in the beacon, the signature being associated with an identity of the first electronic device.

3. The computer-implemented method of claim 1, further comprising:
    sending, to the plurality of electronic devices, information describing the identity associated with the first electronic device and the relative position of the first electronic device.

4. The computer-implemented method of claim 1, further comprising:
    sending, to the first electronic device, information describing the relative position of the first electronic device.

5. The computer-implemented method of claim 1, further comprising:
    receiving, from at least some of the plurality of electronic devices, respective beacons through at least a portion of the array of detectors, each beacon including a respective signature for an electronic device; and
    determining, for the electronic devices from which the respective beacon was received, a relative position of the electronic device based at least in part upon a time difference of arrival determination for at least the portion of the array of detectors that receive the beacon.

6. The computer-implemented method of claim 5, further comprising:
    sending, to the plurality of electronic devices, information describing the determined relative position for each of the detected electronic devices from which the respective beacon was received.

7. The computer-implemented method of claim 5, further comprising:
    displaying, on a display screen, the relative position of the plurality of electronic devices from which the respective ultrasonic beacon was received.

8. A computer-implemented method, comprising:
    detecting, by a first electronic device, at least one second electronic device;
    receiving, by the first electronic device, a signature from the at least one second electronic device;
    sending, from the first electronic device, a beacon including a sound representation of the signature, wherein the at least one second electronic device is configured to:
        receive the beacon through at least two receivers in a receiver array on the at least one second electronic device;
        determine an identity associated with the first electronic device based at least on the signature;
        determine a time difference of arrival for the beacon received by the at least two receivers;
        determine a relative position of the first electronic device based at least in part upon the time difference of arrival; and
        associate the identity associated with the first electronic device with the relative position of the first electronic device.

9. The computer-implemented method of claim 8, further comprising:
    receiving, from the at least one second electronic device, information describing the determined relative position of the first electronic device.

10. The computer-implemented method of claim 8, further comprising:
    receiving, from the at least one second electronic device, information describing a determined relative position of a third electronic device; and
    displaying, on a display screen of the first electronic device, information about the relative position of the first electronic device and the third electronic device.

11. The computer-implemented method of claim 8, wherein sending, from the first electronic device, the beacon including the signature further comprises:
   determining that the first electronic device is placed on a surface; and
   selecting a surface-based propagation mode for sending the beacon.

12. The computer-implemented method of claim 11, wherein selecting the surface-based propagation mode for sending the beacon further comprises:
   determining a propagation frequency for transmitting the beacon based at least in part on a material of the surface.

13. The computer-implemented method of claim 8, further comprising:
   determining, by the first electronic device, that the first electronic device is in motion; and
   sending, from the first electronic device, a second beacon including the sound representation of the signature, wherein the at least one second electronic device is configured to receive the second ultrasonic beacon through the receiver array on the at least one second electronic device,
   wherein the at least one second electronic device is further configured to determine an updated relative position of the first electronic device based at least in part upon a time difference of arrival determination for the second beacon.

14. An electronic device, comprising:
   a processor;
   a display element;
   at least one sound transmitting element;
   a plurality of sound receiving elements; and
   a memory device including instructions operable to be executed by the processor to perform a set of actions, enabling the electronic device to:
      receive a first beacon being transmitted by a second electronic device to at least two sound receiving elements in the plurality of sound receiving elements;
      determine a time difference of arrival of the first beacon received by the at least two sound receiving elements;
      determine a relative position of the second electronic device based at least in part upon the time difference of arrival analysis of the first beacon;
      extract a signature from the first beacon;
      determine an identity of the second electronic device based at least in part upon the extracted signature; and
      associate the identity of the second electronic device with the relative position of the second electronic device.

15. The electronic device of claim 14, wherein the instructions further cause the electronic device to:
   send, to the second electronic device, information describing the relative position of the second electronic device.

16. The electronic device of claim 14, wherein the instructions further cause the electronic device to:
   send, to the second electronic device, information describing a relative position of a third electronic device.

17. The electronic device of claim 14, wherein the instructions further cause the electronic device to:
   send, using the at least one sound transmitting element, a second beacon including a sound representation of the signature associated with the electronic device,
   wherein the second electronic device is able to determine a relative position of the electronic device based at least in part upon a time difference of arrival analysis of the second beacon.

18. The electronic device of claim 17, wherein the identity corresponds to at least one of: a device identifier or a user.

19. The electronic device of claim 14, wherein the at least one sound transmitting element is at least one ultrasonic transmitting element, and the plurality of sound receiving elements are a plurality of ultrasonic receiving elements.

* * * * *